United States Patent [19]

Worster

[11] Patent Number: 6,028,840

[45] Date of Patent: Feb. 22, 2000

[54] METHOD AND APPARATUS FOR CONNECTION ADMISSION CONTROL OF VARIABLE BIT RATE TRAFFIC IN ATM SWITCH

[75] Inventor: Thomas Worster, Boston, Mass.

[73] Assignee: General DataComm, Inc., Middlebury, Conn.

[21] Appl. No.: 08/942,021

[22] Filed: Oct. 1, 1997

Related U.S. Application Data

[60] Provisional application No. 60/027,003, Oct. 4, 1996.

[51] Int. Cl.[7] ............................. G01R 31/08; G06F 11/00
[52] U.S. Cl. ......................... 370/230; 370/235; 370/253; 709/232
[58] Field of Search ..................................... 370/230, 231, 370/232, 235, 252, 253, 468, 477, 233; 709/232, 234, 235

[56] References Cited

U.S. PATENT DOCUMENTS

| 5,646,943 | 7/1997 | Elwalid | 370/230 |
| 5,805,577 | 9/1998 | Jain et al. | 370/253 |
| 5,838,663 | 11/1998 | Elwalid | 370/233 |
| 5,898,670 | 4/1999 | Hoebeke et al. | 370/468 |
| 5,940,369 | 8/1999 | Bhagavath et al. | 370/235 |

OTHER PUBLICATIONS

ElWalid et al., Effective Bandwidth of General Markovial Traffic Source and Admission Control of High Speed Networks, pp. 256–265, 329–343, 1993.

Roberts, J., "Variable–bit–rate Traffic Control in B–ISDN" pp. 50–56, IEEE Communication Magazine, Sep. 1991.

Elwalid, "A New Approach for Allocating Buffers and Bandwidth to Heterogeneous, Regulated Traffic in an ATM Node", IEEE Journal on Selected Areas of Commun., vol. 13, No. 6, Aug. 1995.

"Traffic control and congestion control in B–ISDN",ITU–T I.371, Series I, Aug. 1996.

*Primary Examiner*—Alpus H. Hsu
*Assistant Examiner*—Afsar M. Qureshi
*Attorney, Agent, or Firm*—David P. Gordon; David S. Jacobson; Thomas A. Gallagher

[57] ABSTRACT

A connection admission control system for the link of an ATM switch generally includes a system for accepting a proposed call if the tangent effective bandwidth, a conservative approximation for the bandwidth, of the proposed call when added to the sum of the tangent effective bandwidths of all other calls being handled by that link are less than the capacity of the link is less than the capacity of the link. The proposed call may also be accepted if the zero-loss effective bandwidth for the proposed call when added to the sum of the zero-loss effective bandwidths of all other calls being handled by that link is less than the capacity of the link. The tangent effective bandwidths and zero-loss effective bandwidths are calculated off of the switch by a processor and stored in a table at the switch. When a call request is received it is placed into a connection class, and the tangent effective bandwidth and zero-loss effective bandwidth relating to that connection class is found in the table.

20 Claims, 8 Drawing Sheets

METHOD AND APPARATUS FOR CONNECTION ADMISSION CONTROL OF VARIABLE BIT RATE TRAFFIC IN ATM SWITCH

This application claims the benefit of Provisional Application Ser. No. 60/027,003, filed Oct. 4, 1996, entitled "Method and Apparatus For Connection Admission Control Of Variable Bit Rate Traffic In An ATM Switch", which is hereby incorporated by reference herein in its entirety.

BACKGROUND OF THE INVENTION

1. Field of the Invention

The present invention relates broadly to the field of telecommunications. More particularly, the present invention relates to acceptance or rejection of a proposed connection through an asynchronous transfer mode (ATM) switch or node based on available bandwidth and buffer resources at that location.

2. State of the Art

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing data transfers at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

Because the data contained in the ATM cells can be generated from either generally fixed rate communications, or bursty type communications, it will be appreciated that traffic accommodation mechanisms have been introduced in order to avoid situations where ATM switches or nodes are over-taxed, resulting in loss of cells. In particular, buffering and leaky-bucket usage regulating mechanisms are well known. In addition, it is known in the art that ATM switches and nodes will first determine whether they have the capacity to handle a proposed call before accepting the call. Such a determination is referred to as connection admission control (CAC), some details of which are standardized in ITU-T Recommendation I.371.

In constant rate communications, CAC is as simple as a summing of the data rates of all channels on a link of a switch or node, and a comparing that sum to the total throughput of that link. In variable rate communications, the situation is substantially more complex. In accord with standards, individual connections are judged by various traffic parameters, including peak cell rate (PCR), sustainable cell rate (SCR), and maximum burst size (MBS). It will be appreciated that if a connection is to be established with a guarantee of no cell loss, where buffering is limited, the peak resource demand of all connections in the switch must be added together and must not exceed the resource capacity of the switch, i.e., $$\sum_{i=1}^{N} PCR_i \leq C \qquad (1)$$

where there are N connections through a switch, C is the link capacity and PCR. is the peak cell rate of connection i, i=1, 2, ..., N. However, when using Equation (1) as a CAC test, the actual throughput or utilization will often be considerably lower than the capabilities of the switch, as the peak resource demand may be several times larger than the average resource demand.

To increase utilization, the effective bandwidth $e_i$ of a connection, rather than the PCR, can be used for CAC. The effective bandwidth is derived from a combination of the connection's traffic parameters (PCR, SCR, MBS), the characteristics of the link (the capacity C) and switch (space in the multiplex cell buffer B), and the quality of service specification (a maximum cell loss ratio (CLR)). Using this approach, the CAC system keeps the running total of the effective bandwidth $e_i$ values of established connections, i.e., $$\sum_{i=1}^{N} e_i \leq C, \qquad (2)$$

where there are N connections through a switch, C is the link capacity and $e_i$ is the effective bandwidth of connection i, i=1, 2, ..., N. When a new connection is offered to the link, its effective bandwidth is added to the running total and the result is compared to the link capacity. If the resulting total effective bandwidth is greater than the link capacity, then the connection is rejected. If the resulting total is less than the link capacity, then the call request is accepted and included in the running total of the $e_i$ values when the next call request is received.

In order to limit the number of different calculations necessary to keep a running total of e values, it has been appreciated that the number of different e values can be limited by using connection classes. A connection class is a set of connections having similar traffic parameters; i.e., each connection class has particular values for the peak cell rate (PCR), the sustainable cell rate (SCR), and the maximum burst size (MBS). A connection is classified into the connection class which has values for the traffic parameters closest to, but not less than, the values of the parameters of the connection. An effective bandwidth $e_j$ is calculated for connection class j and the CAC test is modified as $$\sum_{j=1}^{J} K_j e_j \leq C \qquad (3)$$

where the vector $\underline{K}$ is the number of connections in class j.

It has been further appreciated that where there are numerous connections through a switch, it is statistically likely that the peak cell rate will not be reached by all connections at the same time. Thus, while the sum of the sustainable cell rates of all connections must be less than or equal to the available bandwidth through the switch, the sum of the peak cell rates may exceed the available resources while still meeting a targeted cell loss ratio (CLR) (e.g., $10^{-9}$).

This situation of maintaining numerous connections where gain is available is known in the art as a statistically-multiplexable variable bit rate (S-VBR) source situation. Conversely, however, where there are only a few connections which utilize the resources of the switch, there is more likelihood that peak cell rates will be reached by all connections at the same time. Thus, in these circumstances, gain cannot be achieved, and the sum of the peak resource utilization should not exceed the available resources if desirable cell loss ratios are to be met. This situation is known in the art as a nonstatistically-multiplexable variable bit rate (NS-VBR) source situation.

In a paper entitled "A New Approach for Allocating Buffers and Bandwidth to Heterogeneous Regulated Traffic in an ATM Node", *IEEE-JSAC*-13 #6, pp.1115–1127 (1995) by A. Elwalid et al., which is hereby incorporated by reference herein in its entirety, the concept of statistically-multiplexable and nonstatistically-multiplexable VBR traffic types are quantified. Classification into the NS-VBR and S-VBR source types is done by calculating the critical capacity required in order to statistically multiplex connections with given traffic parameters. If the link capacity C is greater than the critical capacity of the link, then the connection type is S-VBR. Otherwise, the connection type is NS-VBR.

In the Elwalid et al. paper, the concept of the effective bandwidth is utilized to quantify the minimum amount of bandwidth allocated to a connection in order to achieve a zero-cell loss ratio, i.e., a "zero-loss effective bandwidth" $e_0$. In particular, it is shown that for a connection having known PCR, SCR, and MBS values, and given a particular link capacity (C) and buffer size (B), a zero-loss effective bandwidth $e_0$ can be determined.

It is also shown that a "single class effective bandwidth" e can be computed. This is the minimum amount of bandwidth a connection should be allocated to achieve a given non-zero cell loss ratio when a number of identical but statistically independent connections are multiplexed onto a link. A value for e can be computed from the connection parameters SCR, PCR, and MBS, the multiplexer parameters B and C, and the target cell loss ratio L.

Different connections having the same connection parameters can be grouped together as a connection class. A boundary region defines the maximum number of connections from each of the classes depending upon the number of connections from the other of the classes. If the number of connection classes to be multiplexed together is J, then a J-dimensional "state space" may be defined with the coordinate system $\{K_j: j=1, \ldots, J\}$ where $K_j$ is the number of connections in class j present in the "multiplex" or mix of connections. Each point in the state space represents a unique mix of connections. The "admissible region" is the set of all points in state space for which the resulting loss ratio is no greater than the target L. The admissible region is a contiguous volume of state space adjacent to the origin bounded by the "admissible region boundary" (and the constraints that $K_j \geq 0$).

Figure 1:
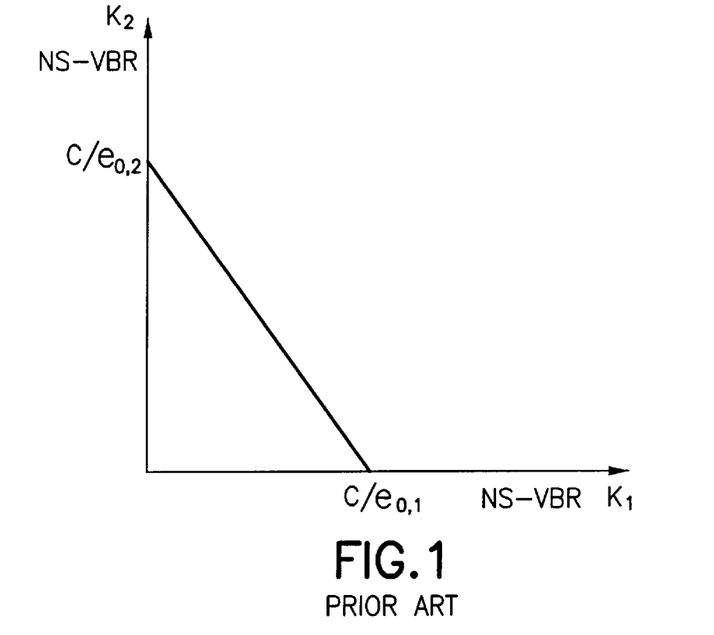
FIG. 1 is a prior art graph showing an acceptance region where two classes of connections of NS-VBR sources are present.
Figure 2:
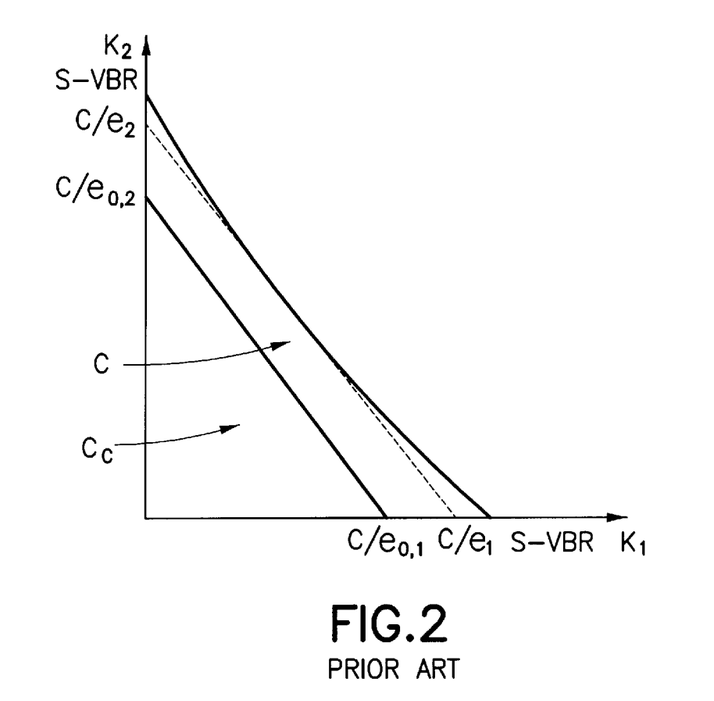
FIG. 2 is a prior art graph showing an acceptance region where two classes of connections of S-VBR sources are present.

The admissible region boundary touches the axes of the state space at $K_j = C/e_j$ for each class $j=1, \ldots, J$. For S-VBR connections, $SCR \leq e < e_0 \leq PCR$. For NS-VBR connections, $SCR \leq e = e_0 \leq PCR$.

Where only two classes of connections are present and both are NS-VBR, the acceptance region is bounded by a straight line as seen in prior art FIG. 1. Where two classes of connections of S-VBR sources are present, the acceptance region is bounded by a slightly curved line as seen in prior art FIG. 2. Using complex equations described in the Elwalid et al. paper, the slightly curved line can be conservatively approximated by a straight line.

Figure 3:
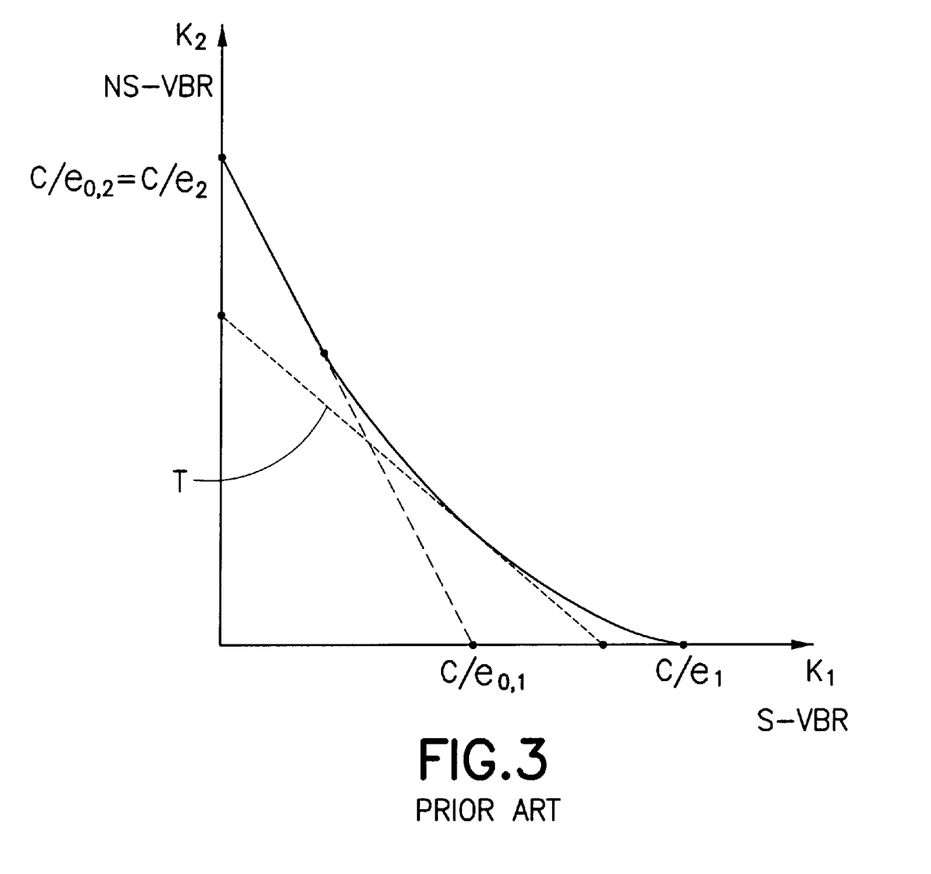
FIG. 3 is a prior art graph showing an acceptance region where one class of S-VBR source and one class of NS-VBR source are present.

The Elwalid et al. paper further analytically deals with the situation where classes from different connection types (S-VBR and NS-VBR) are present. In such situations the boundary of admissible sets is non-linear with a straight line portion and a curved portion. The entire boundary curve cannot be approximated by a straight line. However, according to Elwalid et al., the curved portion of the non-linear boundary may, in many cases be approximated by a straight line which is tangent to an intermediate point of the curve. A representation of the acceptance region boundary associated with a multiple connection type situation is seen in prior art FIG. 3, with the dotted line T representing a line tangent to the curve.

While the Elwalid et al. paper is very useful in quantifying the boundary curves and lines and thus in theory providing a determination of whether calls proposed for a switch can be properly handled by the switch, application of theory set forth in Elwalid et al. to ATM switches is not straightforward. In particular, the calculations required to generate the acceptance curve are extremely complex, and are not feasibly conducted in real time at the switch. In addition, each time a proposed call is received, it must be reviewed in order to determine whether its acceptance would cause movement out of the acceptance region.

SUMMARY OF THE INVENTION

It is therefore an object of the invention to provide methods and apparatus for conducting a connection admission determination at an ATM node or switch.

It is another object of the invention to provide methods and apparatus for conducting connection admission determinations with respect to both S-VBR and NS-VBR sources in substantially real time.

It is a further object of the invention to provide methods and apparatus for defining a tangent effective bandwidth ($e_T$) which is a function of all connections at a node or switch, and which can be used in a simple additive manner to determine whether a proposed call can be handled by an ATM node or switch.

It is an additional object of the invention is to provide methods and apparatus for finding a suitable tangent point to an admissible set boundary curve which can be used to calculate a tangent effective bandwidth.

Another object of the invention is to provide methods and apparatus for determining the gradient of an admissible set boundary curve at a tangent point to the curve.

In accord with the objects of the invention, the method of the invention generally comprises calculating an admissible set boundary curve in two or more dimensions represented by two or more axes for a plurality of S-VBR and NS-VBR sources, choosing a tangent point to the boundary curve, defining a line, plane or hyperplane tangent to the boundary curve by finding the gradient of the boundary curve at the tangent point, and determining a tangent effective bandwidth $e_T$ by finding an intersection of the line, plane or hyperplane with the axes. In determining whether a call can be handled by a link at a node or switch, the tangent effective bandwidth for that call is added to the sum of the tangent effective bandwidths of all other calls being handled by that link and that sum is compared to the capacity of the link.

According to a preferred aspect of the invention, boundary curves relating to classes of connections are calculated off of the switch in a processor. Likewise, tangent effective bandwidths for connection classes are calculated by the processor. However, the tangent effective bandwidths are stored in a table at the switch. Thus, when a proposed call is received, its traffic parameters (PCR, SCR, MBS) are reviewed, and according to one embodiment of the invention, it is placed into a connection class which most closely matches its parameters. Preferably, the matching is done conservatively. Based on the connection class, a tangent effective bandwidth relating to that class is found in the table, and as set forth above, the tangent effective bandwidth for that call is added to the sum of the tangent effective bandwidths of all other calls being handled by that link. The sum is then compared to the capacity of the link, and if it does not exceed the capacity, the call is accepted.

According to an alternative embodiment of the invention, rather than matching a call with a connection class, interpolation of the tangent effective bandwidth table is utilized to find a tangent effective bandwidth for a call which does not fit into an existing connection class. The interpolation method involves using a standard mathematical interpolation (e.g., a cubic spline) between the values of $e_T$ and $e_0$ given in the table to give an interpolated $e_T$ and $e_0$ for connection parameters not represented in the table.

One preferred manner of choosing the tangent point comprises finding a breakpoint where the boundary curve intersects the straight line which defines a zero-loss region, finding a midpoint between the breakpoint and the intersection of the boundary curve with the S-VBR axis. The intersection of the boundary curve and a line between the origin and the midpoint is used as an appropriate tangent point. In three or more dimensions, multiple breakpoints and axis/curve intersections are found, and multiple midpoints are found. Then, the midpoints are averaged, and the intersection of the boundary curve and a line between the origin and the average midpoint is used as the tangent point.

Another preferred manner of choosing the tangent point comprises: finding a breakpoint (point B) where the boundary curve intersects a straight line which defines a zero-loss region, finding a first midpoint (point E) between the breakpoint and the intersection of the boundary curve with the S-VBR axis (point A), finding the gradient of the boundary curve where it intersects with the S-VBR axis, finding the intersection (point C) of a tangent line to that intersection and the straight line which defines the zero-loss region, finding a second midpoint (point D) between points C and A, and finding the intersection of the boundary curve with a line between points E and D, the intersection being used as the tangent point.

According to another preferred aspect of the invention, in determining whether a proposed call can be handled by a link, the effective bandwidth $e_T$ of the proposed call is summed with the tangent effective bandwidths $\Sigma e_T$ of current traffic across the link, and the zero-loss effective bandwidth $e_0$ for the proposed call is also summed with the zero-loss effective bandwidths $\Sigma e_0$ for the current traffic across the link. The proposed call is accepted if either resulting sum is less than the capacity of the link. Thus, preferably, the $e_T$ and $e_0$ values for various connection classes and the running $\Sigma e_T$ and $\Sigma e_0$ are all stored at the switch.

Yet another preferred aspect of the invention includes dividing classes of traffic according to priority level. Then, a connection admission control calculation is conducted for the high priority traffic alone for a link having a high priority buffer, while for a low priority buffer, the connection admission control calculation includes both high priority and low priority traffic classes. Thus, when a high priority call is received, a connection admission control calculation is run for both high priority and low priority queues, while when a low priority call is received, a connection admission control calculation is run only for the low priority queue.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 4:
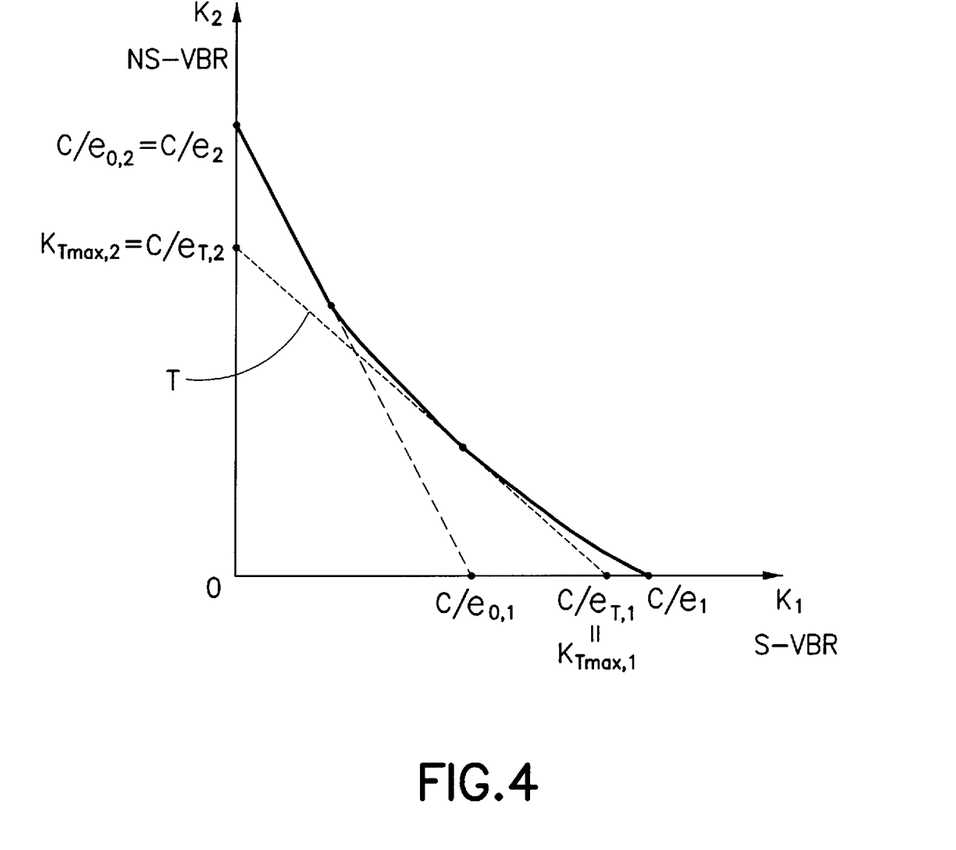
FIG. 4 is a graph similar to FIG. 3 showing the line tangent to the boundary curve of the acceptance region which defines the tangent effective bandwidth according to the invention.

Referring to FIG. 4, according to the invention a tangent effective bandwidth $e_T$, in addition to a zero-loss effective bandwidth $e_0$, is defined for multiple connection classes. As stated above with reference to the Elwalid et al. paper, when the connection classes include a mix of S-VBR (statistically multiplexable variable bit rate) and NS-VBR (non-statistically multiplexable variable bit rate) connection types (for purposes of discussion and visualization herein, the mix being considered as consisting of one S-VBR connection and one NS-VBR connection) the boundary of the acceptance region has two parts, a linear part and a concave part. The concave part of the boundary of the acceptance region intersects the S-VBR axis at a point corresponding to the effective bandwidth $e_j$ (j=1 for a first S-VBR class) for the S-VBR axis. The linear part intersects the NS-VBR axis at a point corresponding to both the effective bandwidth $e_j$ (j=2 for a first NS-VBR class) and the zero-loss effective bandwidth $e_{0,j}$ for the NS-VBR connections. Extending the linear part of the curve until it intersects the S-VBR axis defines a point corresponding to the $e_{0,j}$ for the S-VBR connections. The linear part of the acceptance region is defined by the equation $$\sum_{j=1}^{J} K_j e_{0,j} = C, \tag{5}$$

where $e_{0,j}$ in a leaky bucket regulated traffic system is given by $$e_0 = \begin{cases} \dfrac{P}{1 + \dfrac{B/C}{B_T}(P-r)}, & \text{if } r \le \dfrac{B_T}{B/C} \\ r, & \text{if } \dfrac{B_T}{B/C} \le r \le P \end{cases} \quad (6)$$

and where $B_T$ is the token buffer size of the leaky bucket system, r is the SCR (sustainable cell rate), and P is the PCR (peak cell rate).

Also with reference to FIG. 4, the dotted line T represents a tangent line to a tangent point on the concave part of the curve, and is used as a conservative approximation of the concave part of the curve. Where the tangent line intersects the S-VBR and NS-VBR axes, a tangent effective bandwidth $e_T$ is defined at both the S-VBR and NS-VBR axes. The $K_j$ values at which this tangent line intersects the $K_j$-axes are denoted $K_{Tmax,j}$, and the tangent effective bandwidth $e_{T,j}$ for each connection class $K_j$ is defined by $$e_{T,j} = \frac{C}{K_{Tmax,j}}, \quad (7)$$

where C is the capacity of the link. Methods of choosing the tangent point and finding the tangent line (or tangent plane or hyperplane in the case of a system having more than two connection classes and, hence, more than two axes) are described below. The defined tangent effective bandwidth $e_{T,j}$ conservatively approximates the effective bandwidth $e_j$, as the $e_{T,j}$ values along each axis are within the bounds of the boundary curve. The tangent effective bandwidth $e_{T,j}$ for each connection class is a function of all connection classes $K_j$ (j=1, 2, . . . , n) and, like the effective bandwidth, is based upon the traffic parameters assigned to the connection class; i.e., the peak cell rate (PCR), the sustainable cell rate (SCR), the maximum burst size (MBS), the switch parameters (buffer size B and link capacity C), and the quality of service (QOS) specification; e.g., the specified cell loss ratio (CLR). A table of pre-calculated tangent effective bandwidths for the connection classes, rather than calculating actual effective bandwidths, can then be used to perform conservative CAC checks. As discussed below, utilizing the pre-calculated tangent effective bandwidth values permits an easy real-time calculation by the switch. As such, what would otherwise require the solution of highly complex transcendental equations, which could not be performed in real-time at the switch, is reduced to simple additive equations which may be performed by the switch in real-time.

In accord with the preferred embodiment of the invention, the CAC system preferably makes two checks to determine whether a proposed call can be handled by a link:

$$\sum_{j=1}^{J} K_j e_{0,j} \le C \text{ and } \sum_{j=1}^{J} K_j e_{T,j} \le C. \quad (8)$$

That is, the sum of the tangent effective bandwidths $\Sigma e_T$ of existing traffic is summed with the tangent effective bandwidth $e_T$ of the proposed call and the sum of the zero-loss effective bandwidths $\Sigma e_0$ of the existing calls is summed with the zero-loss effective bandwidth $e_0$ of the proposed call. If either check is satisfied; i.e., if either resulting sum is less than the capacity of the link, then the connection is acceptable. It will be appreciated that utilization of the zero-loss effective bandwidth permits the acceptance of a greater number of proposed calls when there exists a large volume of NS-VBR traffic over the link. That is, calls falling outside the region bounded by the tangent line T, but within the zero-loss region can be accepted (FIG. 4). Using both the tangent effective bandwidth and the zero-loss effective bandwidth enables conservative but efficient acceptance and rejection of proposed calls.

The tangent hyperplane (or a tangent line when only two connection classes, or a tangent plane when three or more connection classes are present, but hereinafter referred to as a tangent hyperplane for any number of classes) is chosen by picking an appropriate tangent point on the curved portion of the boundary of the acceptance region and finding the gradient of that tangent point. The tangent point and gradient of the curved portion at the tangent point will define the tangent hyperplane.

Figure 5:
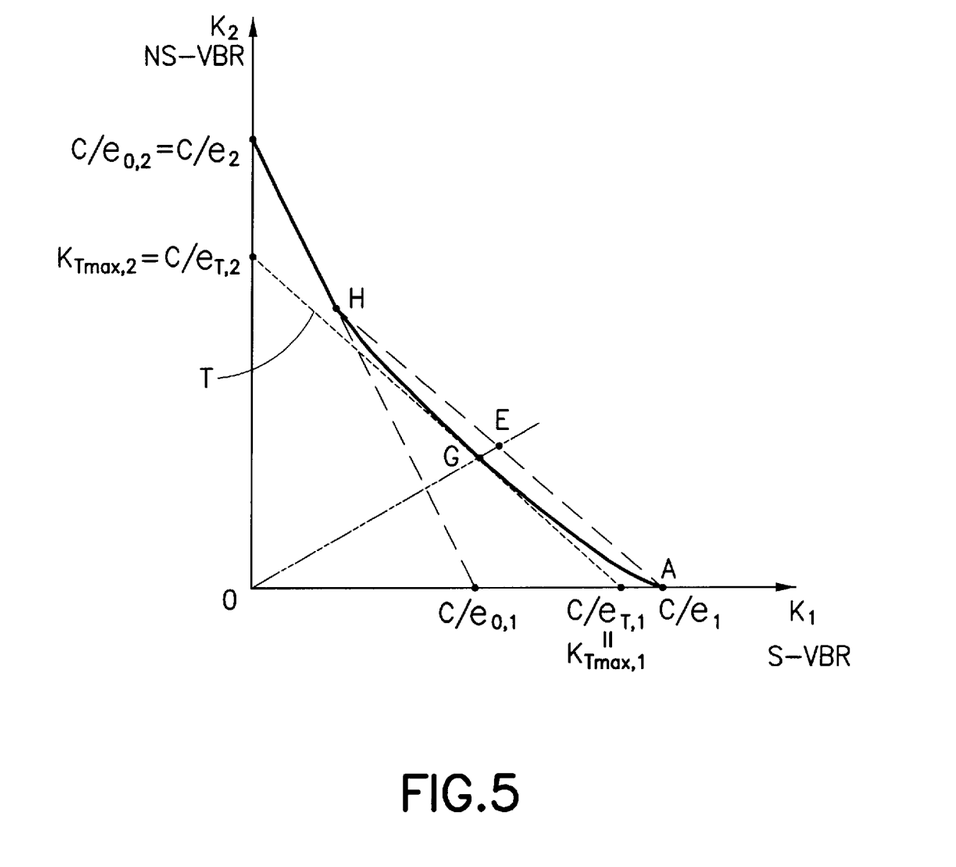
FIG. 5 is a graph similar to FIG. 4 illustrating a first embodiment of the method for determining a tangent point to an acceptance region boundary curve according to the invention.

Referring to FIG. 5, according a preferred embodiment of the invention, for two connection classes $K_1$ and $K_2$, a tangent point is determined by the following method. Point A is defined as the intersection of the boundary curve (the solid line) and the $K_1$ axis. Point H is the breakpoint where the linear portion and curved portion of the boundary curve meet. The midpoint between points A and H defines a third point, point E. A line OE is extended from the origin through point E. Where line OE intersects the boundary curve an appropriate tangent point G is identified.

Once an appropriate tangent point is determined, the gradient at the tangent point is found using equations defined below. The tangent point and the gradient define a line (for two connection classes) which extends to the axis of each connection class K, defining a tangent effective bandwidth $e_T$ for that connection class. Because the $e_T$ of each connection class is a function of all connection classes, the $e_T$ values are therefore summable in order to define whether a connection for one class can be accepted based upon the connections for all other classes.

While the method of finding a tangent point is described above with respect to two connection classes for clarity, it will be appreciated that a tangent hyperplane can be found for more than two connection classes by finding the midpoints between each A and H for each two connection classes and then averaging the midpoints into a resultant point E. Tangent point G is then found at the intersection of line OE, extending from the origin through the averaged point E, and the boundary curve.

Figure 6:
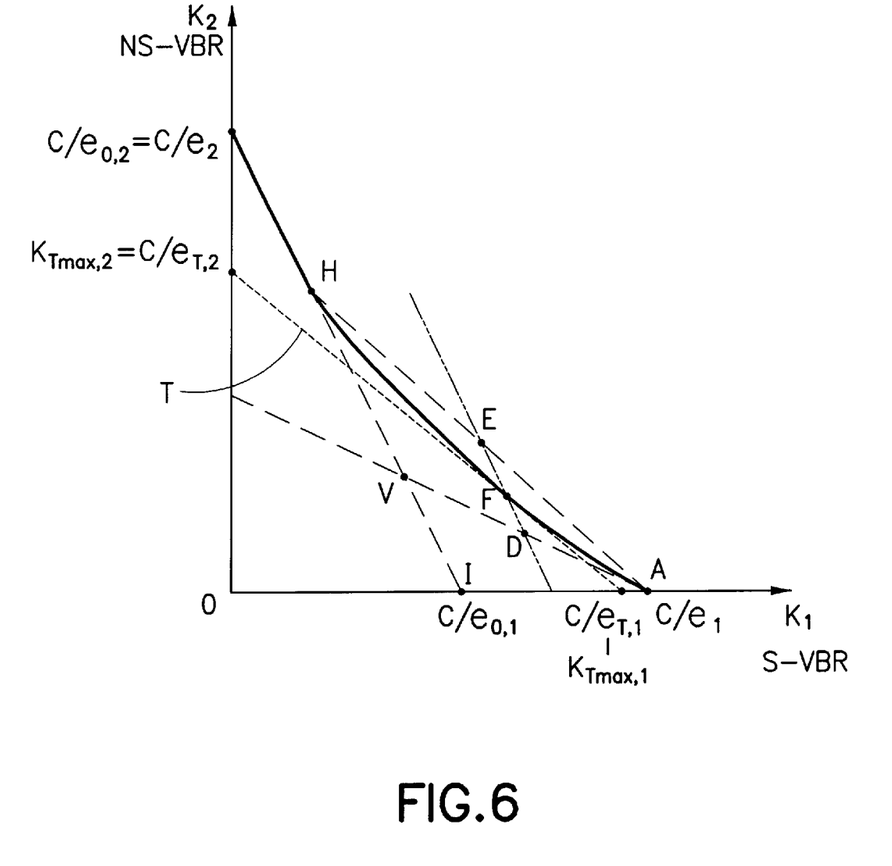
FIG. 6 is a graph similar to FIG. 4 illustrating a second embodiment of the method for determining a tangent point to an acceptance region boundary curve according to the invention.

Turning to FIG. 6, a suitable tangent point can also be selected according to a second method. In a two dimensional system, i.e., for a system having two connection classes, the linear portion of the boundary curve is extended from breakpoint H to intersect the $K_2$ axis at point I, thereby forming line HI. The gradient of the boundary curve at point A is determined. The gradient at point A defines an asymptote which extends through line HI to define a point V. The midpoint between points A and V is defined as point D. The midpoint between points A and H is defined as point E. A line is extended through points D and E and where line DE intersects the boundary curve, a tangent point F is defined. Likewise, it will be appreciated that this algorithm can be used in greater than two dimensions by averaging the points before extending lines therethrough. Once the tangent point is determined, the tangent hyperplane is determined in the same manner as in the first method.

In mathematical terms, the tangent point is found by first, ordering the J connection classes such that classes indexed j (j=1, . . . , $J_S$) are S-VBR classes and classes indexed j (j=$j_{S+1}$, . . . , J) are NS-VBR classes. Second, $\underline{K}_{max,j}$ (j=1, . . . , $J_S$) is the point in the J-dimensional space on the $K_j$ axis where $K_j = K_{max,j}$, and $\underline{K}_{max,j} = (0, \ldots, 0, K_{max,j}, 0, \ldots, 0)$. $K_{max,j}$ is found by solving Equation (9) (Equation (39) in the Elwalid et al. reference) for $K_j$ holding all other $K_i=0$, $i \neq j$:

$$P_{loss} = \frac{\exp(-F_K(s^*))}{s^* \sigma(s^*) \sqrt{2\pi}} \tag{9}$$

with the various terms defined. The equation can be solved using, for example, Newton's method. Third, $\underline{W}_{i,j}$ ($i=1, \ldots, J_S$), ($j=J_S+1, \ldots, J$) is the point in J-dimensional space on the $K_i$-0-$K_j$ plane separating the linear part from the concave part of the acceptance region boundary. $\underline{W}_{i,j} = (0, \ldots, 0, K_i, 0, \ldots, 0, K_j, 0, \ldots, 0)$ (i.e., a vector of J elements, J–2 of which are zero, and the remaining elements of which are $K_i$ and $K_j$ located in the i'th and j'th positions respectively) can be found by solving the system of two linear equations:

$$\begin{cases} K_i e_{0,i} + K_j e_{0,j} = C & (i = 1, \ldots, J_S) \\ K_i \log(1/w_i) + K_j \log(1/w_j) = \log(1/L) & (j = J_S + 1, \ldots, J) \end{cases} \tag{10}$$

with $w = SCR/e_0$. A first approximation P' to an appropriate tangent point P is given by $$\underline{P}' = \frac{1}{2 J_S (J - J_S)} \sum_{i=1}^{J_S} \sum_{j=J_S+1}^{J} (\underline{W}_{ij} + \underline{K}_{max,i}). \tag{11}$$

The tangent point is then given by $$\underline{P} = f \underline{P}' \tag{12}$$

where $f$ is found by placing $\underline{K} = f \underline{P}'$ into Equation (9) and using a secant method to find the value of $f$ that solves the equation.

The gradient of tangent point P (e.g., point G in FIG. 5 or point F in FIG. 6) is $$\left(\frac{\partial K_i}{\partial K_j}\right) \cdot \left(\frac{\partial K_i}{\partial K_j}\right)$$

can be determined by replacing $P_{loss}$ in Equation (9) with L, a constant, such that $$L = \frac{\exp(-F_K(s^*))}{s^* \sigma(s^*) \sqrt{2\pi}}. \tag{13}$$

It will be appreciated that $\sigma(s^*)$ and $s^*$ are functions of $K_i$ and $K_j$ and, as such, Equation (13) defines a relationship between the $\underline{K}$ values, the solution set of which defines the surface representing the boundary of the acceptance region. Holding all $\underline{K}$ values constant except for $K_i$ and $K_j$, both sides of the equation are differentiated with respect to $K_j$ and $$\left(\frac{\partial K_i}{\partial K_j}\right)$$

can be solved to give $$\left(\frac{\partial K_i}{\partial K_j}\right) = \frac{Y_j}{Y_i} \tag{14}$$

where $$Y_j = \sigma(s^*) \frac{\partial s^*}{\partial K_j} + s^* \sigma(s^*) \frac{\partial s^*}{\partial K_j} \frac{\partial}{\partial s} F_K(s^*) + \tag{15}$$
$$s^* \frac{\partial s^*}{\partial K_j} \frac{\partial}{\partial s} \sigma(s^*) + s^* \sigma(s^*) \frac{\partial}{\partial K_j} F_K(s^*) +$$
$$s^* \frac{\partial}{\partial K_j} \sigma(s^*)$$

and the various terms are given by:

$$M_j(s) = 1 - w_j + w_j \exp(s \cdot e_{0,j}) \tag{16}$$

$$\sigma^2(s) = \sum_{j=1}^{J} K_j w_j (1 - w_j) e_{0,j}^2 \frac{\exp(s e_{0,j})}{M_j^2(s)} \tag{17}$$

$$M_j(s) = 1 - w_j + w_j \exp(s e_{0,j}) \tag{18}$$

$$\frac{\partial}{\partial K_j} F_K(s^*) = -\log M_j(s^*) \tag{19}$$

$$\frac{\partial}{\partial K_j} \sigma(s^*) = \frac{w_j (1 - w_j) e_{0,j}^2 \exp(s^* e_{0,j})}{2 M_j^2(s)(s^*)} \tag{20}$$

$$\frac{\partial s^*}{\partial K_j} = \frac{-w_j e_{0,j} \exp(s^* e_{0,j})}{M_j(s^*) \sigma^2(s^*)} \tag{21}$$

$$\frac{\partial}{\partial s} F_K(s^*) = C - \sum_{j=1}^{J} \frac{K_j w_j e_{0,j} \exp(s^* e_{0,j})}{M_j(s^*)} \tag{22}$$

$$\frac{\partial}{\partial s} \sigma(s^*) = \tag{23}$$
$$\frac{1}{2 \sigma(s^*)} \sum_{j=1}^{J} \frac{K_j w_j (w_j - 1) e_{0,j}^3 (w_j - 1 + w_j \exp(s^* e_{0,j})) \exp(s^* e_{0,j})}{M_j(s^*)}$$

The equation defining the tangent hyperplane is then $$\left(\frac{\partial K_i}{\partial \underline{K}}\right)_{\underline{K}=\underline{P}} \cdot (\underline{K} - \underline{P}) = 0 \tag{24}$$

and the values of $K_{Tmax,j}$ ($j=1, \ldots, J$), and thus of $e_{T,j} = C/K_{Tmax,j}$, can be found by substituting $K_i=0$, ($i \neq j$) in to Equation (24). The above equation may be further understood by reference to the previously incorporated Elwalid et al. reference.

According to a preferred aspect of the invention, $e_T$ and $e_0$ values which are calculated off of an ATM switch and corresponding connection class traffic parameters are organized into an effective bandwidth table (EBT) file which is stored at an ATM switch. As such, when a call request is received, the parameters of the call request are retrieved, a connection class is determined based on the traffic parameters, and $e_T$ and $e_0$ values for the determined connection class can be read from the EBT FILE. As stated above, the equations for determining $e_T$ and $e_0$ values are very complex and it is not practical to determine the solution to such equations in real time. However, because $e_T$ and $e_0$ values for connection classes are stored in the EBT FILE, the $e_T$ and $e_0$ for the proposed call may be simply added to the running sums related to the existing calls in order to make a determination as to whether a proposed call can be accepted.

Figure 7:
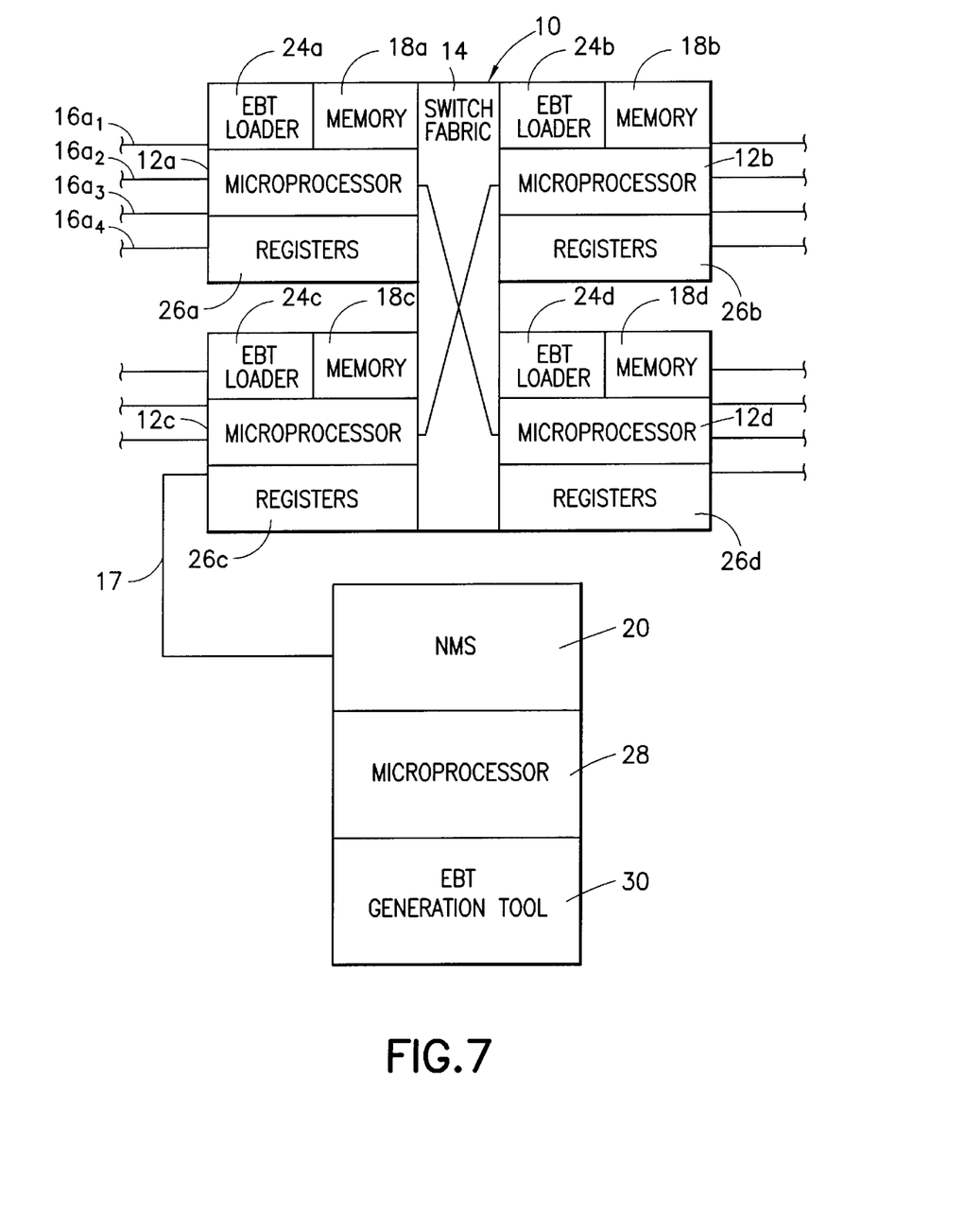
FIG. 7 shows a schematic of an ATM switch and an off-switch system for creating an effective bandwidth table according to the invention.

Referring to FIG. 7, a preferred ATM switch 10 (sold by General Datacomm under the trademark APEX) is shown. The ATM switch 10 generally includes a plurality of microprocessors 12a, 12b, 12c, 12d (also called slot controllers) with associated circuitry, and a switch fabric 14. The slot controllers have interfaces to multiple ATM lines (links), e.g. lines $16a_1$–$16a_4$, and at least one of the slot controllers 12c has an interface (usually Ethernet) with a network management system (NMS) 20 which is used to help manage the ATM switch.

As shown in FIG. 7, associated with each slot controller 12a, 12b, 12c, 12d is a memory (RAM) 18a, 18b, 18c, 18d which is used to store the effective bandwidth table (EBT) file, an EBT loader 24a, 24b, 24c, 24d, described below, and registers 26a, 26b, 26c, 26d which store two running totals, $\Sigma e_T$ and $\Sigma e_0$, for each link (corresponding to the total $e_T$ and $e_0$ of all the traffic currently passing through the ATM switch on that link). The running totals are required to perform the two checks of Equation (8). The $\Sigma e_T$ and $\Sigma e_0$ totals are updated as traffic through a link is increased or decreased.

The data for the EBT file is generated off the ATM switch 10 by an off-switch microprocessor 28 and an EBT generation tool 30, which is a software package designed for solving complex equations, e.g. the Mathematica™ software package sold by Wolfram Research, Inc. of Champaign, Ill. A user inputs into the EBT generation tool the connection class traffic parameter specifications (the PCR, SCR, and MBS are specified for each connection class), the switch parameters (buffer size B and link capacity C), and the QOS specification (CLR). The units of SCR, PCR, and C are arbitrary units of bandwidth (e.g., Mbits/s, cells/s, etc.), the units preferably being cells/s and preferably being the same for all three. The units of MBS and B are arbitrary units of buffer size (e.g., cells, kilobits, megabytes, etc.), the units preferably being cells and preferably being the same for both. The preferable units are the units desired for the entries of the EBT file. Equation (6) for the $e_0$ values is inserted into the EBT generation tool and the EBT generation tool outputs the $e_0$ for each connection class. Equations (7) and (9)–(24), defined above, for the $e_T$ values and connection class traffic parameters are inserted into the EBT generation tool and the EBT generation tool outputs the $e_T$ for each connection class. The output of the EBT generation tool is the EBT file containing $e_T$ and $e_0$ values matched against a corresponding connection class; i.e., a predefined set of traffic parameters (PCR, SCR, and MBS).

Referring to FIG. 7, once the user is satisfied with the EBT file data, the network management system (NMS) 20 is used to distribute the EBT file, preferably using TFTP (trivial file transfer protocol), through the interface 17 to each slot controller 12a, 12b, 12c, 12d on the switch 10. The slot controllers receive the EBT file and verify that all $e_0$ and $e_T$ values in the EBT file are no less than the SCR for respective connection classes. Once verified, the EBT loader 24a, 24b, 24c, 24d in each slot controller replaces an older EBT file with the new EBT file, the running totals in registers 26a, 26b, 26c, 26d are recalculated for the new EBT file, and each slot controller is able to perform connection admission control (CAC) using the new EBT data.

Figure 8:
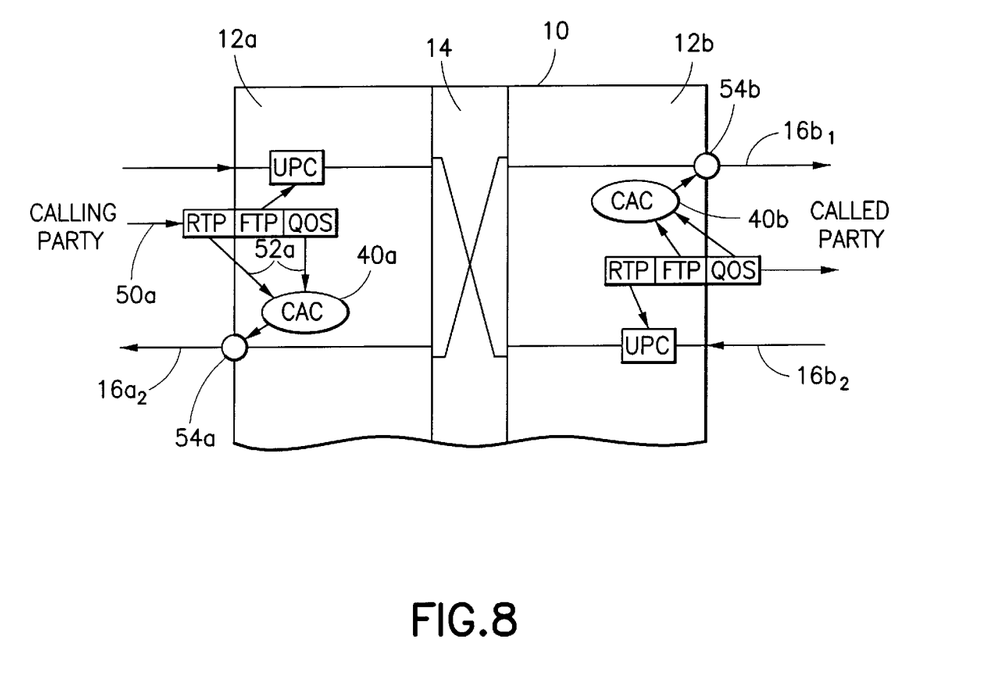
FIG. 8 is a data flow diagram for the method according to the invention of performing connection admission control within slot controllers of an ATM switch.

Referring to FIG. 8 and with reference to slot controllers 12a and 12b, the CAC system operates with the call control process as follows. On a signalling channel 50a, the slot controller 12a receives an incoming connection set-up request to send a proposed call over link $16b_1$ on slot controller 12b. The set-up request including QOS parameters, specifications of the connection's forward cell flow traffic parameters (FTP) (i.e., PCR, SCR, and MBS in the forward cell flow direction), and specification for the connection's return cell flow traffic parameters (RTP) (i.e., PCR, SCR, and MBS in the return cell flow direction). Slot controller 12a sends at 52a an allocation request, including the QOS and RTP parameters, to the CAC system 40a which manages bandwidth allocation on the connection path. In the preferred embodiment, the CAC system uses the requested QOS and RTP parameters to determine at 54a, and as described below, whether enough unallocated bandwidth is available on a return link (egress link), e.g. $16a_2$, of the slot controller 12a for the offered connection's return cell flow. Similarly, and as discussed below, the CAC system 40b of the slot controller 12b uses the requested QOS and RTP parameters to determine at 54b whether enough unallocated bandwidth is available on the egress of the forward link $16b_1$.

Figure 9:
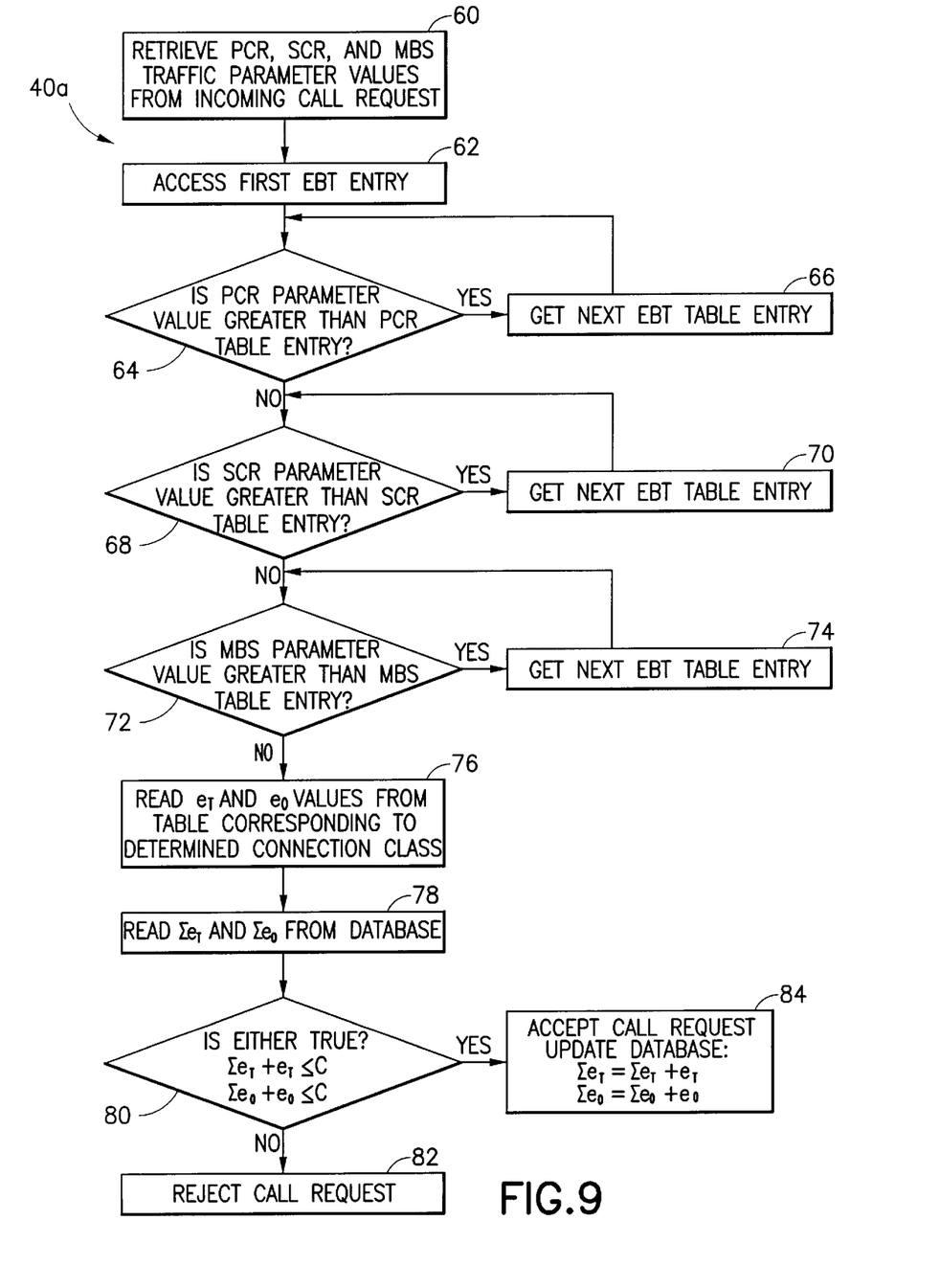
FIG. 9 is a flow diagram of the queries performed by the connection admission control system in a slot controller according to the invention.

Referring to FIGS. 8 and 9, the CAC system 40a of the first slot controller 12a (the slot controller coupled to the calling party) retrieves at 60 the RTP of the call request and ascertains the connection class of the call request based upon the return traffic parameters. The PCR EBT file entry which is closest to, but not less than the PCR value of the RTP of the call request is determined at 62, 64, 66. The SCR EBT file entry which is closest to, but not less than the SCR value of the RTP of the call request is determined at 68, 70. The MBS EBT file entry which is closest to, but not less than the MBS value of the RTP of the call request is determined at 72, 74. The values of the PCR, SCR and MBS which satisfy the inquiries determine the connection class of the RTP of the call request. It will be appreciated that as no table entry values are chosen which are less than the traffic parameters values, the connection class is conservatively determined. The $e_T$ and $e_0$ values for that connection class; i.e., the class having the closest traffic parameters which are not less than the SCR, PCR, and MBS for the call request, are read at 76 from the EBT file entry for the corresponding connection class. Next, the $\Sigma e_T$ and $\Sigma e_0$ values are read at 78 from the registers 26a. The CAC system adds the $e_T$ value of the connection class assigned to the proposed call to the $\Sigma e_T$ value and adds the $e_0$ value of the connection class assigned to the proposed call to the $\Sigma e_0$ value. Both resulting sums are compared at 80 to the capacity of the egress link.

If both sums are greater than the capacity of the link, then the call request is rejected at 82 (i.e., the call set-up procedure is terminated and a release message is returned to the calling party) and the $\Sigma e_T$ and $\Sigma e_0$ totals in the registers 26a are unchanged.

If either sum is less than the capacity of the egress link, then the call request is accepted at 84 and $\Sigma e_T$ and $\Sigma e_0$ totals are updated at 84 to include the $e_T$ and $e_0$ of the accepted call. The connection's FTP parameters are used at 86 to configure the usage parameter control (UPC) of the call and the connection request is forwarded at 88 toward the called party.

A similar process is followed on slot controller 12b. An allocation request to the CAC system managing bandwidth allocation on egress link $16b_1$ is made utilizing the QOS and FTP parameters of the call request. The CAC system 40b allocates bandwidth for the connection's forward cell flow on its egress link. If the CAC system rejects the connection, the release message is returned towards the calling party which is intercepted by slot controller 12a and the bandwidth resources are released. Likewise, if a downstream switch towards the called party rejects the call then both the ingress and egress slot controllers 12a, 12b must intercept the release message and clear the connection reserved resources on links $16a_2$ and $16b_1$ coupled to slot controllers 12a and 12b.

It will be appreciated that in the preferred embodiment of the invention, the slot controllers do not allocate or check for availability of resources on ingress links; but only on egress links. This is because the slot controllers cannot generally estimate the quality of service (i.e., CLR) in the upstream equipment since it has no information on the capabilities of that upstream equipment.

In addition, according to the invention a special case is also provided for constant bit rate (CBR) traffic through a link. CBR traffic on a link does not require a sophisticated CAC system which can handle both S-VBR and NS-VBR connections. Nevertheless, a CAC for VBR traffic must take into account CBR traffic sharing the link. The presence of CBR traffic must be accounted for in the calculation of the $e_0$ and $e_T$ and in the VBR CAC. Therefore, CBR traffic is treated as belonging to a special VBR connection class and the $e_0$ and $e_T$ of the special VBR connection class are calculated using the same concepts as for VBR with the SCR set equal to some arbitrary value $PCR_{CBR}$. When a CBR connection is processed in the CAC, its $e_0$ and $e_T$ values are taken as $PCR/PCR_{CBR}$ times the $e_0$ and $e_T$ values calculated for the CBR connection class.

Furthermore, the CAC system of the invention can be configured to handle different service priority levels. According to a preferred aspect of the invention, three priority distinctions are supported. First is a cell queue that has service priority over other cell queues. Second is a cell queue with a cell loss priority (CLP) discarding threshold and regulated incoming CLP="1" traffic; i.e., the CLP="1" cell stream is policed and tagging is not used. Third is a cell queue with a CLP discarding threshold and regulated incoming CLP="1" traffic; i.e., the CLP="1" cell stream is not policed and/or tagging is used. In each case effective bandwidth allocations are made that allow for the different buffer sizes, for the CLR limits, and also for the influence of one queue over the others. For example, in the case of two queues, with a first queue of high priority and a second queue of low priority, in calculating a CAC for the high priority queue, only high priority connections are accounted for, as low priority connections have no influence. Conversely, for the lower priority queue, the CAC must account for both high and low priority connections. Thus, if connections labeled j (j=1, ... $J_H$) are high priority and those labeled j (=$J_H$+1, ..., J) are low priority, then the CAC checks are:

$$\left(\sum_{j=1}^{J_H} K_j e_{HO,j} \leq C \text{ OR } \sum_{j=1}^{J_H} K_j e_{HT,j} \leq C\right)$$

AND $$\left(\sum_{j=1}^{J_H} K_j e_{LO,j} \leq C \text{ OR } \sum_{j=1}^{J_H} K_j e_{LT,j} \leq C\right)$$

where $e_{HO}$ and $e_{HT}$ are the lossless and tangent effective bandwidths respectively, calculated using the buffer size $B_1$ and link capacity C, and $e_{LO}$ and $e_{LT}$ are the lossless and tangent effective bandwidths calculated using the buffer size $B_2$ and link capacity C.

There have been described and illustrated herein several embodiments of a connection admission control system and a method of determining whether a call request can be accepted by a switch. While particular embodiments of the invention have been described, it is not intended that the invention be limited thereto, as it is intended that the invention be as broad in scope as the art will allow and that the specification be read likewise. Thus, while particular methods for determining an appropriate tangent point for use in determining the tangent effective bandwidth have been disclosed, it will be appreciated that the tangent effective bandwidth can be found for more than two connection classes, and that other appropriate tangent points can be found and used as well for determining the tangent effective bandwidth for a call or connection class. Furthermore, while the use of connection classes have been disclosed for limiting the number of EBT entries, it will be appreciated that a very large number of EBT entries can be provided in the EBT file to cover a greater number of possible traffic parameters, or that a fewer number of entries may be provided and that $e_T$ and $e_0$ values may be found via interpolation of surrounding $e_T$ and $e_0$ values. Interpolation would typically involve using a standard mathematical interpolation (e.g., a cubic spline) between the values of $e_T$ and $e_0$ given in the table to give an interpolated $e_T$ and $e_0$ for connection parameters not represented in the table. Also, while Mathematica™ has been disclosed as the EBT generation tool, it will be appreciated that other software programs may be used as well. Moreover, while a particular ATM switch has been described and shown, it will be appreciated that the invention applies to switches of different architectures. It will therefore be appreciated by those skilled in the art that yet other modifications could be made to the provided invention without deviating from its spirit and scope as so claimed.

I claim:

1. A connection admission control system for determining whether a call request for a proposed call having predetermined traffic parameters can be accepted by a network switch having an output link with limited bandwidth capacity, said connection admission control system comprising:

a) means for determining a tangent effective bandwidth corresponding to the predetermined traffic parameters of the proposed call; and b) means for determining whether the output link can accommodate the proposed call, said means for determining making a determination from the tangent effective bandwidth of the proposed call and from the tangent effective bandwidths of other existing calls on the output link.

2. A connection admission control system according to claim 1, further comprising:

c) means for determining a zero-loss effective bandwidth corresponding to the predetermined traffic parameters of the proposed call, wherein, said means for determining utilizes said zero-loss effective bandwidth of the proposed call and the zero-loss effective bandwidths of other existing calls on the output link in making said determination.

3. A connection admission control system according to claim 1, wherein:

said means for determining comprises means for storing at the network switch a plurality of tangent effective bandwidths, one each for a plurality of combinations of traffic parameters.

4. A connection admission control system according to claim 3, wherein:

said means for storing stores said plurality of combinations of traffic parameters relating to said plurality of tangent effective bandwidths, and said means for determining further comprises means for obtaining said predetermined traffic parameters of said proposed call and means for comparing said predetermined traffic parameters with at least one of said plurality of combinations of traffic parameters.

5. A connection admission control system according to claim 3, further comprising:

c) means for generating off of the network switch said plurality of tangent effective bandwidths; and d) means for transferring said plurality of tangent effective bandwidths to said means for storing.

6. A connection admission control system according to claim 5, wherein:

said means for generating generates zero-loss effective bandwidths for said plurality of combinations of traffic parameters, and said means for determining utilizes said zero-loss effective bandwidth of the proposed call and the zero-loss effective bandwidths of other existing calls on the output link in making said determination.

7. A connection admission control system according to claim 1, wherein:

said means for determining whether the output link can accommodate the proposed call includes,
(i) memory means for storing a sum of the tangent effective bandwidths of the other existing calls on the output link,
(ii) means for adding the tangent effective bandwidth of the proposed call to the sum of the tangent effective bandwidths of the other existing calls on the output link to provide a first proposed sum, and
(iii) means for comparing said first proposed sum to the capacity of the output link.

8. A connection admission control system according to claim 7, wherein:

said memory means stores a sum of a plurality of zero-loss effective bandwidths of the other existing calls on the output link, said means for adding adds the zero-loss effective bandwidth of the proposed call to said sum of said plurality of zero-loss effective bandwidths of the other existing calls on the output link to provide a second proposed sum, and said means for comparing compares said second proposed sum to the capacity of the output link, said call request being accepted when one of said first proposed sum and said second proposed sum is less than the capacity of the output link.

9. A connection admission control system according to claim 5, wherein:

said means for generating includes,
(i) means for determining an acceptance region boundary in n-space, where n is an integer greater than 1, for statistically variable bit rate (S-VBR) traffic and non-statistically variable bit rate (NS-VBR) traffic for a plurality of connection classes,
(ii) means for determining a tangent point to said boundary,
(iii) means for determining n−1 gradients of said tangent point,
(iv) means for determining a tangent effective bandwidth for each of said plurality of connection classes from said tangent point and said n−1 gradients.

10. A connection admission control system according to claim 9, further comprising:

e) means for determining a zero-loss effective bandwidth corresponding to the predetermined traffic parameters of the proposed call, wherein
said means for determining utilizes said zero-loss effective bandwidth of the proposed call and the zero-loss effective bandwidths of other existing calls on the output link in making said determination.

11. A connection admission control system according to claim 9, wherein:

said means for determining a tangent point includes,
(A) means for finding a breakpoint where a curved portion of said boundary intersects a straight portion of said boundary,
(B) means for finding a midpoint between said breakpoint and an intersection of said boundary with an S-VBR axis, and
(C) means for finding said tangent point where said boundary and a line between an origin point and said midpoint intersect.

12. A connection admission control system according to claim 9, wherein:

n is greater than two, and
said means for determining a tangent point includes,
(A) means for finding a plurality of breakpoints where a curved portions of said boundary intersect straight portions of said boundary,
(B) means for finding a plurality of midpoints between said breakpoints and intersections of said boundary with a plurality of S-VBR axes,
(C) means for finding and averaging said plurality of midpoints to define an average midpoint, and
(D) means for finding said tangent point where said boundary and a line between an origin point and said average midpoint intersect.

13. A connection admission control system according to claim 4, wherein:

said means for storing stores said plurality of combinations of traffic parameters relating to said plurality of tangent effective bandwidths, and said means for determining further comprises means for obtaining said predetermined traffic parameters of said proposed call and means for comparing said predetermined traffic parameters with at least one of said plurality of combinations of traffic parameters, said means for comparing includes means for choosing the combination of traffic parameters which has values closest to but not less than the values of the predetermined traffic parameters of the proposed call.

14. A connection admission control system according to claim 13, further comprising:

c) means for determining a zero-loss effective bandwidth corresponding to said combination of traffic parameters of the proposed call which has values closest to but not less than the values of the predetermined traffic parameters of the proposed call.

15. A method for determining whether a switch can accept a proposed call based upon the capacity of an output link and the traffic currently over the output link, comprising:

a) determining a tangent effective bandwidth for the proposed call; and b) determining whether a first sum of the tangent effective bandwidths of the traffic currently over the output link added to said tangent effective bandwidth of the proposed call is less than a capacity of the link.

16. A method according to claim 15, further comprising:

c) determining a zero-loss effective bandwidth for the proposed call; and d) determining whether a second sum of the zero-loss effective bandwidths of the traffic currently over the output link added to said zero-loss effective bandwidth of the proposed call is less than the capacity of the link.

17. A method according to claim 15, further comprising:

c) generating off of the network switch said plurality of tangent effective bandwidths; and d) transferring said plurality of tangent effective bandwidths to the switch for storage thereon.

18. A method according to claim 17, further comprising:

e) at the switch, retrieving call request traffic parameters from the proposed call; and f) based on said call request traffic parameters of said proposed call, selecting one of said plurality of tangent effective bandwidths stored on said switch.

19. A method according to claim 18, further comprising:

g) generating off of the network switch said plurality of zero-loss effective bandwidths;

h) transferring said plurality of zero-loss effective bandwidths to the switch for storage thereon; and i) based on said call request traffic parameters of said proposed call, selecting one of said plurality of zero-loss effective bandwidths stored on said switch.

20. A method according to claim 19, further comprising:

j) accepting said proposed call when said first sum or a second sum is less than the capacity of the link, said second sum being a sum of the zero-loss effective bandwidths of the traffic currently over the output link added to said one of said plurality of zero-loss effective bandwidths.

* * * * *